United States Patent
Dadam et al.

(10) Patent No.: US 11,261,769 B2
(45) Date of Patent: Mar. 1, 2022

(54) EXHAUST TUNING SYSTEM AND METHOD

(71) Applicant: Ford Global Technologies, LLC, Dearborn, MI (US)

(72) Inventors: Sumanth Reddy Dadam, Dearborn, MI (US); Hani Mohammad Ayesh, Canton, MI (US); Vinod Kumar Ravi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/749,259

(22) Filed: Jan. 22, 2020

(65) Prior Publication Data

US 2021/0222595 A1    Jul. 22, 2021

(51) Int. Cl.
*F01N 1/16* (2006.01)

(52) U.S. Cl.
CPC .......... *F01N 1/166* (2013.01); *F01N 2390/02* (2013.01); *F01N 2900/10* (2013.01); *F01N 2900/12* (2013.01)

(58) Field of Classification Search
CPC combination set(s) only.
See application file for complete search history.

(56) References Cited

U.S. PATENT DOCUMENTS

| 8,392,091 | B2* | 3/2013 | Hebbale | F01N 9/00 |
| | | | | 701/102 |
| 9,744,980 | B2* | 8/2017 | Henry | B61C 17/12 |
| 10,392,002 | B2* | 8/2019 | Leone | B60W 30/18018 |
| 2005/0201567 | A1 | 9/2005 | Browne et al. | |
| 2019/0010885 | A1* | 1/2019 | Dudar | B60W 10/06 |
| 2019/0211743 | A1* | 7/2019 | Santillo | F02D 41/0007 |
| 2020/0362735 | A1* | 11/2020 | Ravi | F01N 9/00 |

OTHER PUBLICATIONS

Dadam, S. et al., "Methods and Systems for an Exhaust Tuning Valve," U.S. Appl. No. 16/565,398, filed Sep. 9, 2019, 44 pages.

* cited by examiner

*Primary Examiner* — Binh Q Tran
(74) *Attorney, Agent, or Firm* — Geoffrey Brumbaugh; McCoy Russell LLP

(57) ABSTRACT

Methods and systems are provided for adjusting a position of an exhaust valve that regulates engine exhaust noise. In one example, the position of the exhaust valve is adjusted according to a road grade estimate. The road grade estimate may be based on a vehicle's present position on a road or a position that is a distance away from the vehicle's present position.

18 Claims, 7 Drawing Sheets

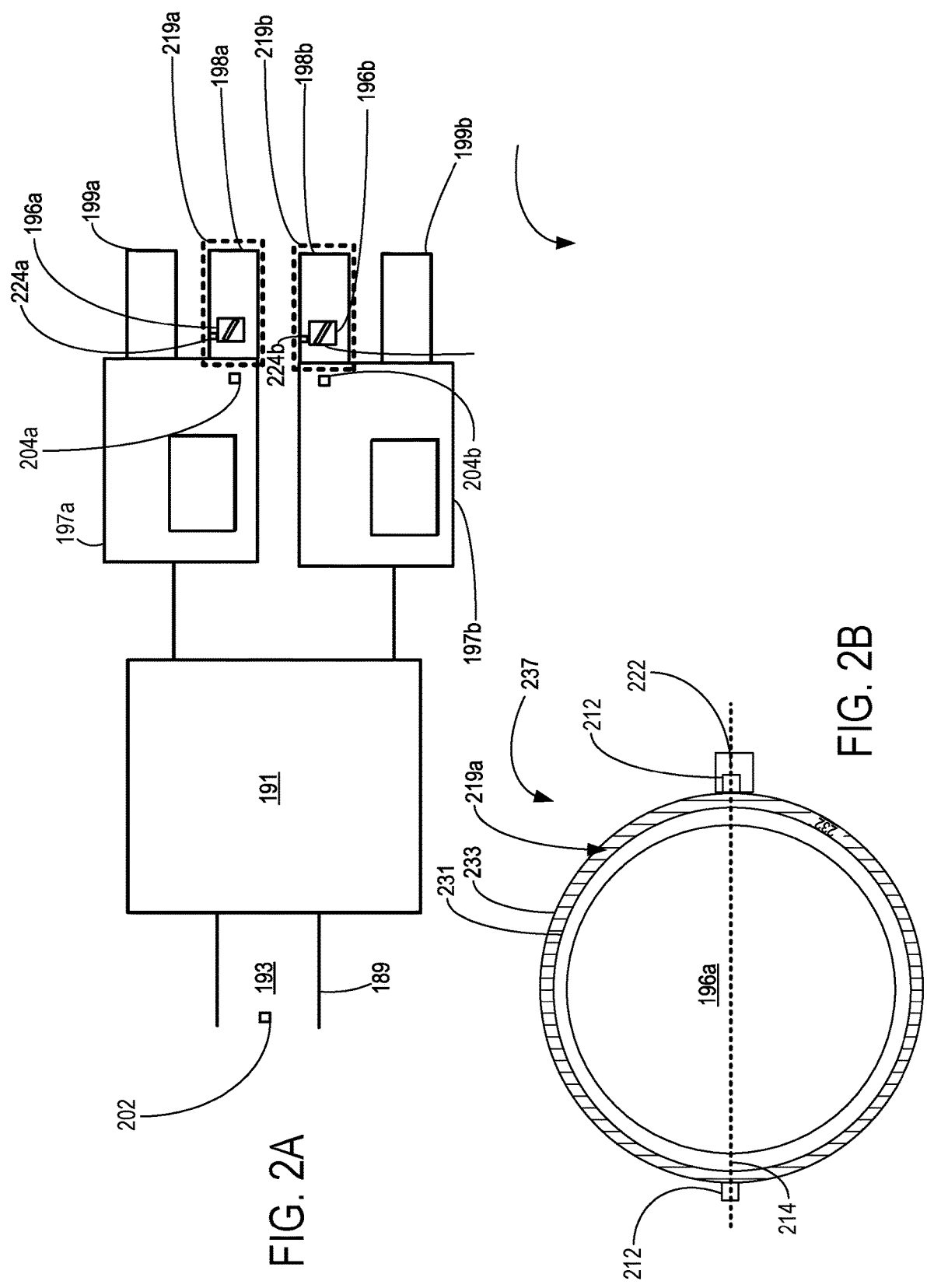

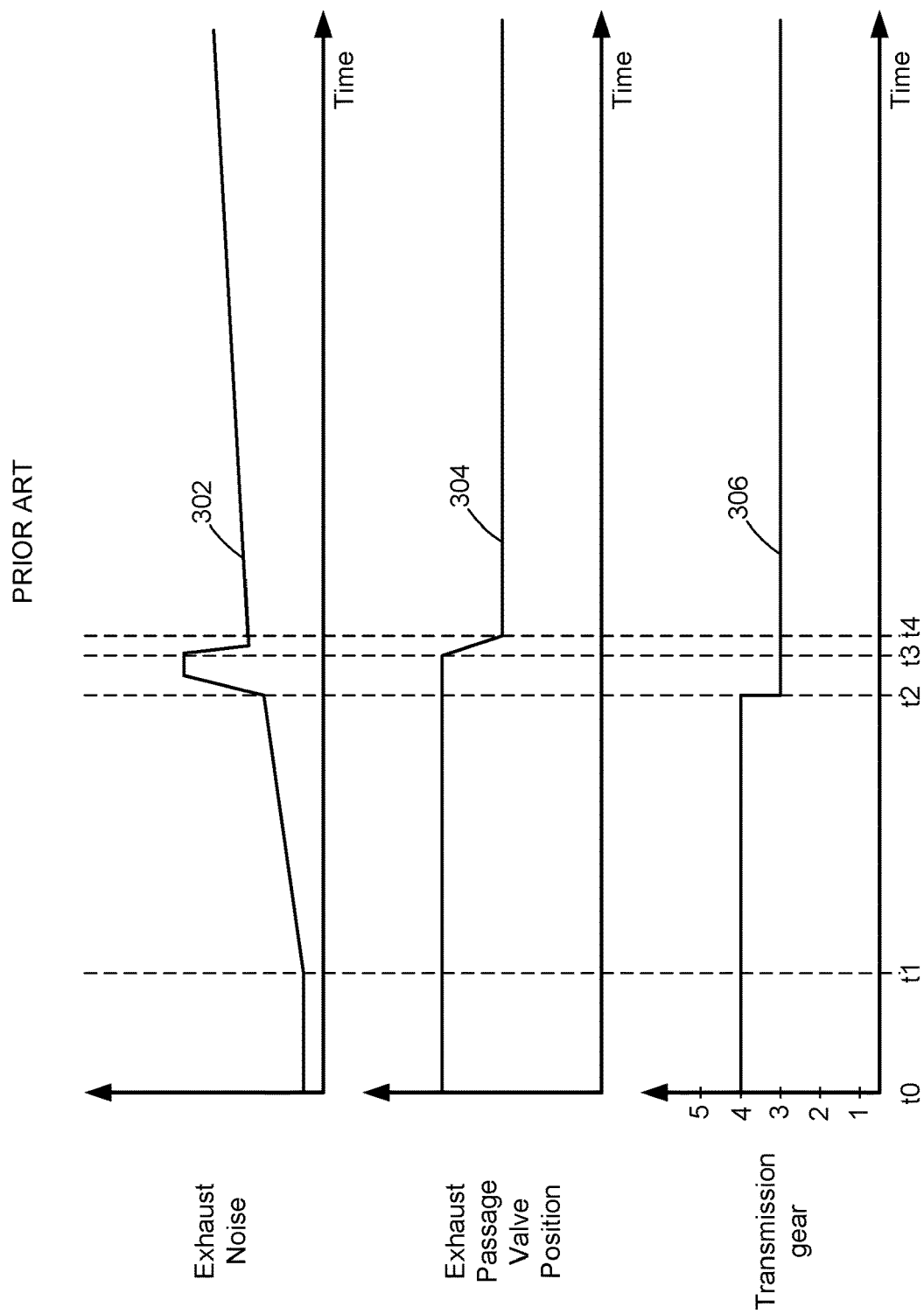

EXHAUST TUNING SYSTEM AND METHOD

FIELD

The present description relates generally to methods and systems for adjusting a position of an exhaust valve that may be positioned to change sound that emanates from a vehicle exhaust system.

BACKGROUND/SUMMARY

An engine may include an exhaust system that has one or more exhaust valves that may be adjusted to change sound of engine exhaust. The position of the one or more exhaust valves may be adjusted according to a mode that a user manually selects. The modes may include but are not limited to a baseline mode, sport mode, track mode, and quiet mode. The one or more valves may be at least partially closed to decrease engine noise when a vehicle is being driven in urban areas (e.g., baseline mode or quiet mode). Conversely, the one or more exhaust valves may be at least partially opened to increase engine noise and engine power when the vehicle is being driven on a closed track (e.g., track mode). If the vehicle is being driven outside of urban areas, but not on a closed track, the exhaust valve may be adjusted to an intermediate position (e.g., baseline mode or sport mode). The intermediate position may cause engine noise to be greater than engine noise in urban areas, but less than engine noise when the vehicle is operating on a closed track. However, if the vehicle is mode is set to baseline mode or sport mode where the vehicle operator expects an intermediate level of engine noise and the vehicle downshifts, then engine noise may increase at a higher rate than may be expected due to an increase in engine speed that is due to the downshift. The vehicle operator may find the increase of engine noise to be unexpected and undesirable. The inventors herein have recognized the above-mentioned issues and have developed a method for operating an exhaust system of an engine, comprising: adjusting a position of valve in an exhaust system in response to a grade of a road, the valve positioned downstream of an exhaust gas after treatment device.

By adjusting a position of a valve of an exhaust system in response to a grade of a road, it may be possible to provide the technical result of reducing engine noise when a downshift of a transmission occurs due at least in part to a grade of a road. In one example, the position of the valve may be adjusted to a more closed position in response to an increasing road grade so that the valve may be position to deaden engine noise more substantially before a transmission downshift occurs. In this way, noise that is generated by an engine may be controlled to improve driver satisfaction.

The present description may provide several advantages. In particular, the approach may reduce a possibility of short engine noise bursts that vehicle occupants may find objectionable. Further, the approach provides a look-ahead feature so that grade of a road may be determined at the vehicle's present position, or at a future vehicle location. In addition, the approach may make accommodations for different vehicle operating modes so that engine noise may meet a driver's expectations.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A shows detailed view of an example variable exhaust tuning system;

FIG. 2B shows an upstream-looking point of view of an exhaust valve from the downstream end of the exhaust valve;

FIG. 3 shows a prior art exhaust valve position changing sequence;

DETAILED DESCRIPTION

The following description relates to systems and methods for operating a valve of an exhaust system. The exhaust valve may be adjusted to control engine exhaust noise for a plurality of vehicle modes. The exhaust valve position may also be adjusted according to a grade or slope of a road so that the possibility of unintended noise bursts propagating through the exhaust system may be reduced. Maps describing exhaust valve position for different vehicle modes and road grades may be provided to control the exhaust valve.

Figure 1A:
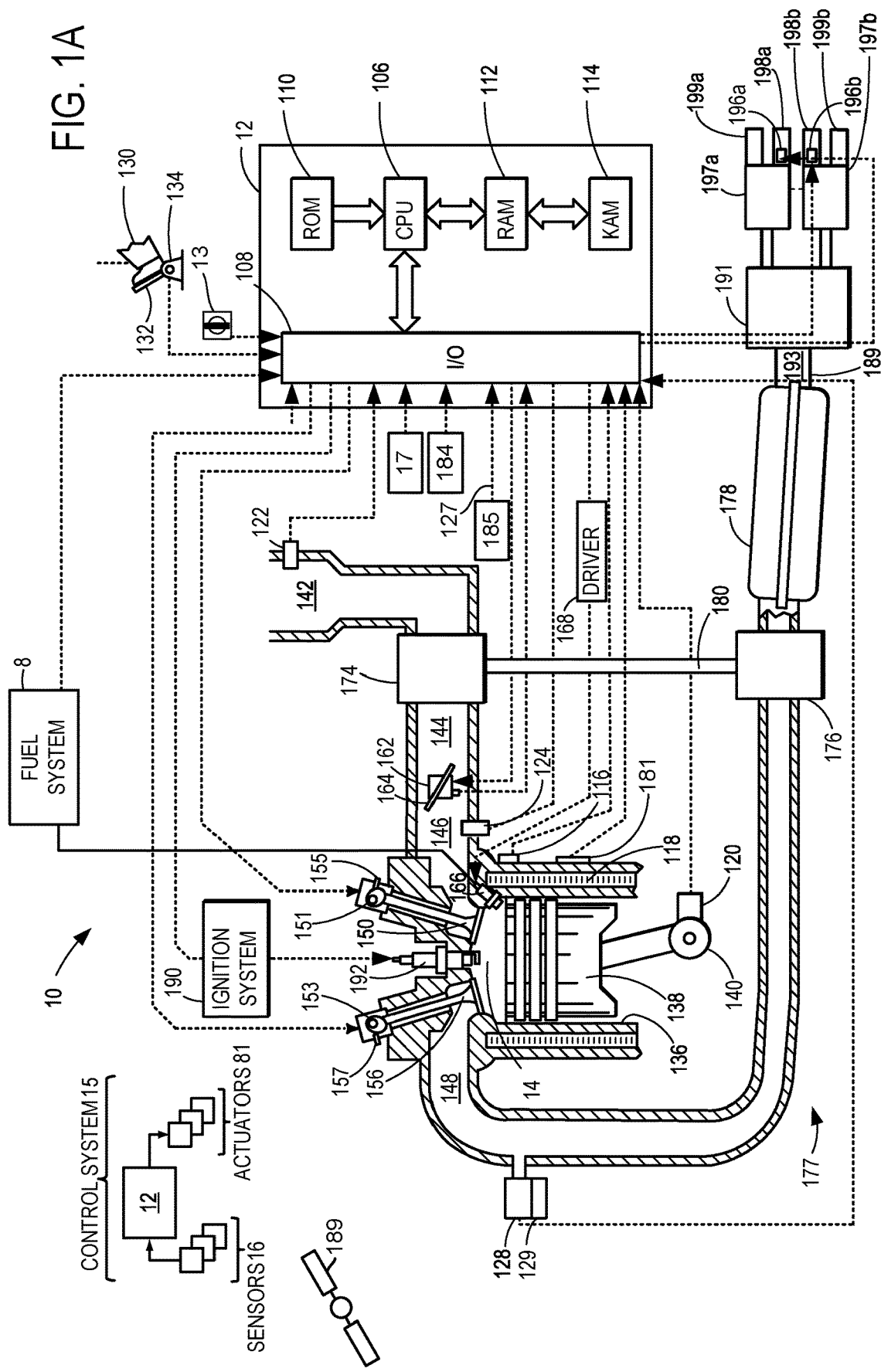
FIG. 1A shows an example internal combustion engine with variable exhaust tuning system.

FIGS. 1A-2B may be discussed collectively to provide a clear description. FIG. 1A depicts an example embodiment of a combustion chamber or cylinder of internal combustion engine 10. Engine 10 may receive control parameters from a control system including controller 12 and input from a human vehicle operator 130 via an input device 132. In this example, input device 132 includes an accelerator pedal and a pedal position sensor 134 for generating a proportional pedal position signal. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system as shown in FIG. 1B. Further, a starter motor may be coupled to crankshaft 140 via a flywheel to enable a starting operation of engine 10. Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1A shows engine 10 configured with a turbocharger including a compressor 174 arranged between intake passages 142 and 144, and an exhaust turbine 176 arranged along exhaust passage 148 of exhaust system 177. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1A, or alternatively may be provided upstream of compressor 174.

Exhaust passage 148 may receive exhaust gases from other cylinders of engine 10 in addition to cylinder 14. Thus, exhaust flows from engine 10 to turbine 176 and then to emissions control device (e.g., three way catalyst, oxidation catalyst, particulate filter, or combination thereof) 178. Exhaust gas sensor 128 is shown coupled to exhaust temperature sensor 129 of exhaust passage 148 upstream of emission control device 178. In an alternate embodiment, these sensors may not be located adjacent to one another and may be dispersed through exhaust passage 148. Exhaust gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof. Exhaust gas sensor 128 and exhaust temperature sensor 129 provide input to controller 12 via input/output ports 108.

Exhaust tuning resonator 191 may receive exhaust gases from emission control device 178 via post-treatment passage 193 having post-treatment walls 189. Resonator 191 may be fluidically coupled to emission control device 178 via post-treatment passage 193. In an example, resonator 191 may also be fluidically coupled to a first muffler 197a, and resonator 191 may also be fluidically coupled to a second muffler 197b. In one example, the first muffler 197a may be fluidically connected to a first muffler inner exhaust port 198a and a first muffler outer exhaust port 199a. In another example, the second muffler 197b may be fluidically connected to a second muffler inner exhaust port 198b and a second muffler outer exhaust port 199b. In an example, a microphone 195 may be located between the first and second mufflers 197a, 197b and may be attached to first and second mufflers 197a and 197b via supports.

In a further example, the first muffler inner exhaust port 198a and the second muffler inner exhaust port 198b may, respectively, include a first adjustable exhaust valve 196a and a second adjustable exhaust valve 196b. In an example, the first and second adjustable exhaust vales 196a, 196b may be communicatively coupled to the controller 12 via input/output ports 108. In an example, the first and second adjustable exhaust valves 196a, 196b may be damper valves, butterfly valves, globe valves, ball valves, poppet valves, quarter turn valve, compression valve or other valve controlled by an actuator (the actuator to be discussed in more detail with respect to FIGS. 2A and 2B). In an example, the first and second adjustable exhaust valves 196a and 196b may be controlled by an operator of the motor vehicle to adjust a sound experience of the vehicle.

In an example, adjusting the first and second adjustable exhaust valves 196a and 196b may adjust the sound level and/or back pressure of the exhaust system of the vehicle.

In an example, the resonator 191, mufflers 197a and 197b, outer exhaust ports 199a and 199b, and inner exhaust ports 198a and 198b may be configured and/or shaped to provide adjustable exhaust tuning, or increased and decreased exhaust sound levels, via adjustment of adjustable exhaust valves 196a, 196b.

In an example, the first and second adjustable exhaust valves 196a and 196b may be adjustable by the controller 12 in response to vehicle operating conditions including human driver input and vehicle operating mode. Vehicle operating mode may be input via a human operator via mode selector 13 (e.g., a human/machine interface). Controller 12 may adjust an angular position of the first and second adjustable exhaust valves 196a and 196b in response to vehicle operating conditions including but not limited to engine speed, engine load, road grade, engaged transmission gear, vehicle operating mode, etc. as further elaborated herein.

In another example, resonator 191 may be configured to receive exhaust gases directly from exhaust passage 148 downstream of exhaust turbine 176 and the first and second mufflers 197a, 197b may each include an emission control device 178 within the first and second mufflers 197a, 197b. In such an example post-treatment passage 193 may fluidically couple exhaust turbine 176 to resonator 191.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize some form of variable valve timing (VVT) such as one or more of cam profile switching (CPS), variable cam timing (VCT), such as twin independent variable cam timing (tiVCT), and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems.

In some embodiments, each cylinder of engine 10 may include a spark plug 192 for initiating combustion. Ignition system 190 can provide an ignition spark to combustion chamber 14 via spark plug 192 in response to spark advance signal from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing fuel. As a non-limiting example, cylinder 14 is shown including one fuel injector 166. Fuel injector 166 is shown coupled directly to cylinder 14 for injecting fuel directly therein in proportion to the pulse width of signal received from controller 12 via electronic driver 168. In this manner, fuel injector 166 provides what is known as direct injection (hereafter also referred to as "DI") of fuel into combustion cylinder 14. While FIG. 1A shows injector 166 as a side injector, it may also be located overhead of the piston, such as near the position of spark plug 192. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

Fuel may be delivered by the injector to the cylinder during a single cycle of the cylinder. Furthermore, for a single combustion event, multiple injections of the delivered fuel may be performed per cycle. The multiple injections may be performed during the compression stroke, intake stroke, or any appropriate combination thereof.

As described above, FIG. 1A shows one cylinder of a multi-cylinder engine. As such each cylinder may similarly include its own set of intake/exhaust valves, fuel injector(s), spark plug, etc.

Controller 12 is shown in FIG. 1A as a microcomputer, including microprocessor unit 106, input/output ports 108, an electronic storage medium for executable programs and calibration values shown as read only memory 110 in this particular example, random access memory 112, keep alive memory 114, and a data bus. Controller 12 may receive various signals from sensors coupled to engine 10, in addition to those signals previously discussed, including measurement of inducted mass air flow from mass air flow sensor 122; engine coolant temperature from temperature sensor 116 coupled to cooling sleeve 118; a profile ignition pickup signal from Hall effect sensor 120 (or other type) coupled to crankshaft 140; throttle position from a throttle position sensor; manifold absolute pressure signal from sensor 124; and knock signal from knock sensor 181. Knock sensor 181 may alternatively be located on the cylinder head or may be a sensor to detect vibrations from knock in crankshaft 140. Engine speed signal, RPM, may be generated by controller 12 from output of sensor 120. Manifold pressure from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by microprocessor unit 106 for performing the methods described below as well as other variants that are anticipated but not specifically listed. Engine 10 may be controlled at least partially by a control system 15 including controller 12. Controller 12 may receive various signals from sensors 16 coupled to engine 10, and send control signals to various actuators 81 coupled to the engine and/or vehicle. The various sensors may include, for example, various temperature, pressure, and air-fuel ratio sensors. The various actuators may include, for example, valves, throttles, and fuel injectors.

As mentioned above, sensors 16 may include any temperature, pressure, positioning, humidity or contacting sensors or any other sensors described herein. In an example, sensors 16 may include one or more microphones. Actuators 81 may include actuators used to control the first and second adjustable exhaust valves 196a, 196b. Controller 12 may be a microcomputer, including a microprocessor unit, input/output ports, an electronic storage medium for executable programs and calibration values. Controller 12 may be programmed with computer readable data representing instructions executable to perform the methods described below as well as other variants that are anticipated but not specifically listed.

For example, adjusting the first and second adjustable exhaust valves 196a, 196b may include adjusting actuators 81 coupled to adjustable exhaust valves 196a, 196b. In an example, to adjust an angle of an adjustable exhaust valve 196a or valve 196b, actuators 224a and 224b may open or close the valve by providing torque via a rotational rod connected to valve 196a along the valve rotational axis 214, further described below with respect to FIG. 2B.

Global positioning receiver 184 may receive timing signals from satellite 189 for determining a position of vehicle 1. Global positioning receiver 184 may send a position of vehicle 1 to vehicle navigation system 185 and/or controller 12. Navigation system 185 may reference representations of geographical maps stored in memory to determine the position of vehicle 1. In addition, vehicle navigation system 185 may determine a grade of a road that vehicle 1 is traveling according to a look-ahead vehicle position. The look-ahead vehicle position may be determined from the vehicle's present location and a distance from the vehicle in the direction that the vehicle is traveling at which road grade may be desired to be determined. In one example, the look-ahead distance may be a function of vehicle speed and vehicle operating mode. However, in other examples, the look-ahead distance may be based on additional or other vehicle operating conditions. For example, if the vehicle is traveling at 10 kilometers/hour in a baseline vehicle operating mode, then the look-ahead distance may be determined to be zero so that road grade may be determined at the vehicle's present location. In another example, if the vehicle were traveling at 100 kilometer/hour in sport mode, the look-ahead distance may be determined to be 500 meters so that road grade may be determined sooner to overcome timing for the exhaust valves to move. In one example, controller 12 may exchange control variables with navigation system 185 via a controller area network 127. In particular, controller 12 may provide navigation system 185 a desired look-ahead distance and navigation system 185 may provide controller 12 with a road grade value of the road that vehicle 1 is traveling at the look-ahead distance from vehicle 1. In an alternative example, navigation system 185 may be included in controller 185.

Controller 12 may receive a road grade via inclinometer 17. A road grade may be expressed as an angular percentage that indicates the slope of the road that vehicle 1 is traveling. For example, vehicle 1 may be traveling at a position on a road that has a 3% grade.

Figure 1B:
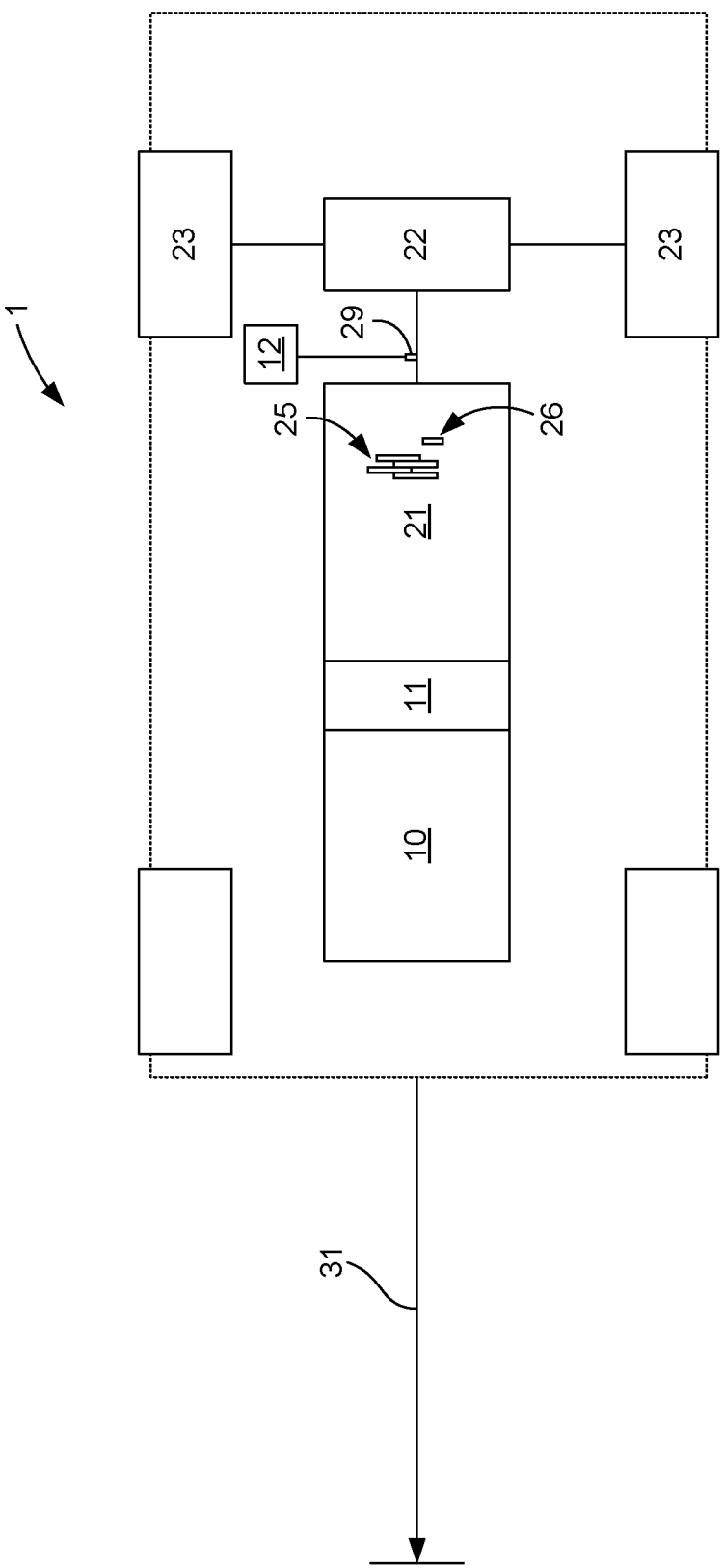
FIG. 1B shows an example vehicle driveline that includes the engine of FIG. 1A.

Referring now to FIG. 1B, vehicle 1 is shown including engine 10. Engine 10 is coupled to torque converter 11, and torque converter 11 is coupled to automatic transmission 21.

Automatic transmission includes a plurality of forward gears 25 and a reverse gear 26. Transmission 21 is coupled to differential 22, and differential 22 is coupled to wheels 23. Engine 10 may transmit torque to torque converter 11. Torque converter 11 dampens torque oscillations from engine 10 and it delivers torque to transmission 21. Wheels 23 may rotate and propel vehicle 1 when torque is provided to wheels 23 via transmission 21 and differential 22. Vehicle speed may be determined by controller 12 according to output of speed/position sensor 29. It should be noted that this is only one example vehicle driveline configuration that may take advantage of the present method. Accordingly, the method described herein may be applied to other vehicle drivelines including front wheel drive, four wheel drive, and hybrid vehicles.

A look-ahead distance 31 is also shown in FIG. 1B. The look-ahead distance may be determined as a function of vehicle speed. Further, the look-ahead distance may be a function of other vehicle control parameters as well. For example, the look-ahead distance 31 may be a function of a vehicle operating mode (e.g., "quiet," "base," "sport," and "track"). The look-ahead distance is a distance from the vehicle's present location along a road that is being traveled by the vehicle. For example, if a look-ahead distance is 500 meters, determining grade of a road at the look-ahead distance includes determining a grade of a road at a location that is 500 meters ahead of vehicle 1 and on the road that vehicle 1 is traveling.

FIG. 2A shows a detailed example view of the variable exhaust tuning system 177. In an example, exhaust valve 196a and 196b may be positioned within first and second sleeves 219a and 219b. In an example, 219a and 219b may be laid over and around 198a or 198b and in another example, 219a and 219b may entirely replace 198a and 198b. In another example, the first and second heat exchanger sleeves 219a and 219b may cover a portion of the total external surface area of the first and second inner exhaust ports 198a and 198b. In an example, the portion of the total external surface area of the first and second inner exhaust ports 198a and 198b may be centered on the adjustable exhaust valves 196a and 196b. In an example, the portion of the total external surface area of the first and second inner exhaust ports 198a and 198b may be centered upon the operating area of the adjustable exhaust valves 196a and 196b. In a further example, the portion of the total external surface area of the first and second inner exhaust ports 198a and 198b which is covered by the first and second heat exchanger sleeves 219a and 219b may be the operating area of the adjustable exhaust valves 196a and 196b.

In an example, the variable exhaust tuning system may comprise a plurality of actuators 81. In an example, adjustable exhaust valves 196a and 196b may be respectively adjusted by a first valve actuator 224a and a second valve actuator 224b. In an example, the adjustable exhaust valves 196a, 196b may have an exhaust port length, comprising an upstream-downstream length of an operating area of the adjustable exhaust valves 196a and 196b. In an example, the operating area of the adjustable exhaust valves 196a and 196b may include an upstream-downstream length of the space the adjustable exhaust valves 196a and 196b occupy and/or use.

First and second valve actuators 224a, 224b may be communicatively coupled to controller 12. In an example, control system may include controller 12 which may receive signals from the sensors 16 and employ actuators 81 to adjust engine operation and/or variable exhaust tuning system operation based on the received signals and instructions stored on a memory of the controller further described herein.

FIG. 2B shows a cross-section 237 of an inner exhaust port 198a or 198b equipped with a sleeve 219a or 219b. The cross-section 237 shows an upstream-looking point of view from the downstream end of either a first or second muffler inner exhaust port 198a or 198b, and in such an example, either adjustable exhaust valves 196a or 196b may comprise a butterfly, damper, quarter turn, or compression valve. In some cases, the positioning of adjustable exhaust valves 196a and 196b may be adjusted by adjustable exhaust valve actuators 224a and 224b which may be represented in FIG. 2B by actuator 222. Actuator 222 may, in an example, adjust the position or rotation angle of valve 196a along a valve rotational axis 214, wherein the rotational axis includes a rotational rod in order to provide turning of the valve 196a via actuator 222. In an example, the rotational rod of valve rotational axis 214 may be attached to and passing through valve 196a or it may be built into valve 196a as a single body.

In an example, first or second inner exhaust ports 198a or 198b may additionally include the sleeve 219a, and sleeve 219a covers valve 196a. Valve 196a may be opened so that exhaust gases may at least partially bypass muffler 197a, thereby increasing engine exhaust noise. The exhaust system 177 may also include one or more valve positioning sensors 212 which may be positioned along the valve rotational axis 214 of the valve 196a and they may also be attached to the rotational rod running along valve rotational axis 214. In an example, valve positioning sensors 212 may provide continuous indication of valve 196a position. In addition, valve positioning sensors 212 may be communicatively coupled to controller 12 via input/output ports 108. In an example, valve positioning sensor 212 may be included within actuator 222.

Thus, the system of FIGS. 1A-2B provides for a vehicle system, comprising: an engine; an exhaust system coupled to the engine, the exhaust system including a valve positioned downstream of an emissions control device; a global position receiver; and a controller including executable instructions stored in non-transitory memory that cause the controller to adjust a position of the valve in response to a grade of a road, the grade of the road based on a position of a vehicle, the position of the vehicle determined via the global position receiver. The vehicle system further comprises additional instructions to adjust the position of the valve in response to a vehicle operating mode. The vehicle system includes where the vehicle operating mode is a quiet mode and where the valve is fully closed. The vehicle system includes where the vehicle operating mode is a track mode and where the valve is fully opened. The vehicle system includes where the position of the valve is adjusted according to a plurality of valve position maps. The vehicle system includes where the plurality of valve position maps include a baseline valve map, a sport mode valve map, a track mode valve map, and a quiet mode valve map. The vehicle system further comprises additional instructions to adjust a look-ahead distance from a vehicle for which the grade of the road is estimated.

Referring now to FIG. 3, a prophetic prior art exhaust valve adjustment procedure is shown. The plots occur at the same time and they are aligned in time. The vertical lines at times t0-t4 represents times of interest during the sequence.

The first plot from the top of FIG. 3 is a plot of engine exhaust system noise level (e.g., decibels) versus time. The engine exhaust system noise level increases in the direction of the vertical axis arrow. The horizontal axis represents time and time increases from the left side of the plot to the right side of the plot. Trace 302 represents an engine noise level.

The second plot from the top of FIG. 3 is a plot of engine exhaust valve opening amount or position versus time. The engine exhaust valve opening amount or position increases in the direction of the vertical axis arrow. The horizontal axis represents time and time increases from the left side of the plot to the right side of the plot. Trace 304 represents an opening amount of an exhaust valve (e.g., 196a).

The third plot from the top of FIG. 3 is a plot of transmission gear versus time. The transmission gear that is engaged is indicated via the numbering along the vertical axis. The horizontal axis represents time and time increases from the left side of the plot to the right side of the plot. Trace 306 indicates which gear of the transmission is presently engaged.

At time t0, the exhaust noise level is low and the exhaust valve position is open a large amount while a vehicle (not shown) transmission is engaged in fourth gear. Such conditions may be present when a vehicle is cruising at highway speed.

At time t1, a grade of a road that the vehicle is traveling on begins to increase (not shown). The exhaust valve position remains unchanged and the transmission is still engaged in fourth gear.

The exhaust noise begins to increase as a human driver begins to increase a position of an accelerator pedal (not shown) to maintain vehicle speed. By increasing the position of the accelerator pedal, the driver increases the engine load.

At time t2, the transmission is downshifted from fourth gear to third gear based on engine load or driver demand torque and engine speed. The exhaust noise increases in response to the downshift since downshifting the transmission increases engine speed (not shown). The position of the exhaust valve is unchanged, so an increase of engine noise caused by the transmission gear downshift is indicated by the increase in exhaust noise.

At time t3, the exhaust valve controller reacts to the transmission downshift, which increases engine speed while engine load is elevated (not shown). Specifically, the exhaust valve controller reduces the exhaust valve opening amount in response to the change in engine speed that was caused by the transmission gear downshift. The exhaust noise remains at a high level at this time.

Between time t3 and time t4, the exhaust noise level is reduced by closing the exhaust valve. Closing the exhaust valve prevents exhaust gases from bypassing the muffler so exhaust noise is reduced via the muffler.

At time t4, the exhaust valve is fully closed and the engine noise level is reduced. The transmission gear remains in fourth gear. The exhaust noise increases at a low rate after time t4 as the driver increases engine load (not shown) to maintain vehicle speed in response to grade of the road.

Figure 4:
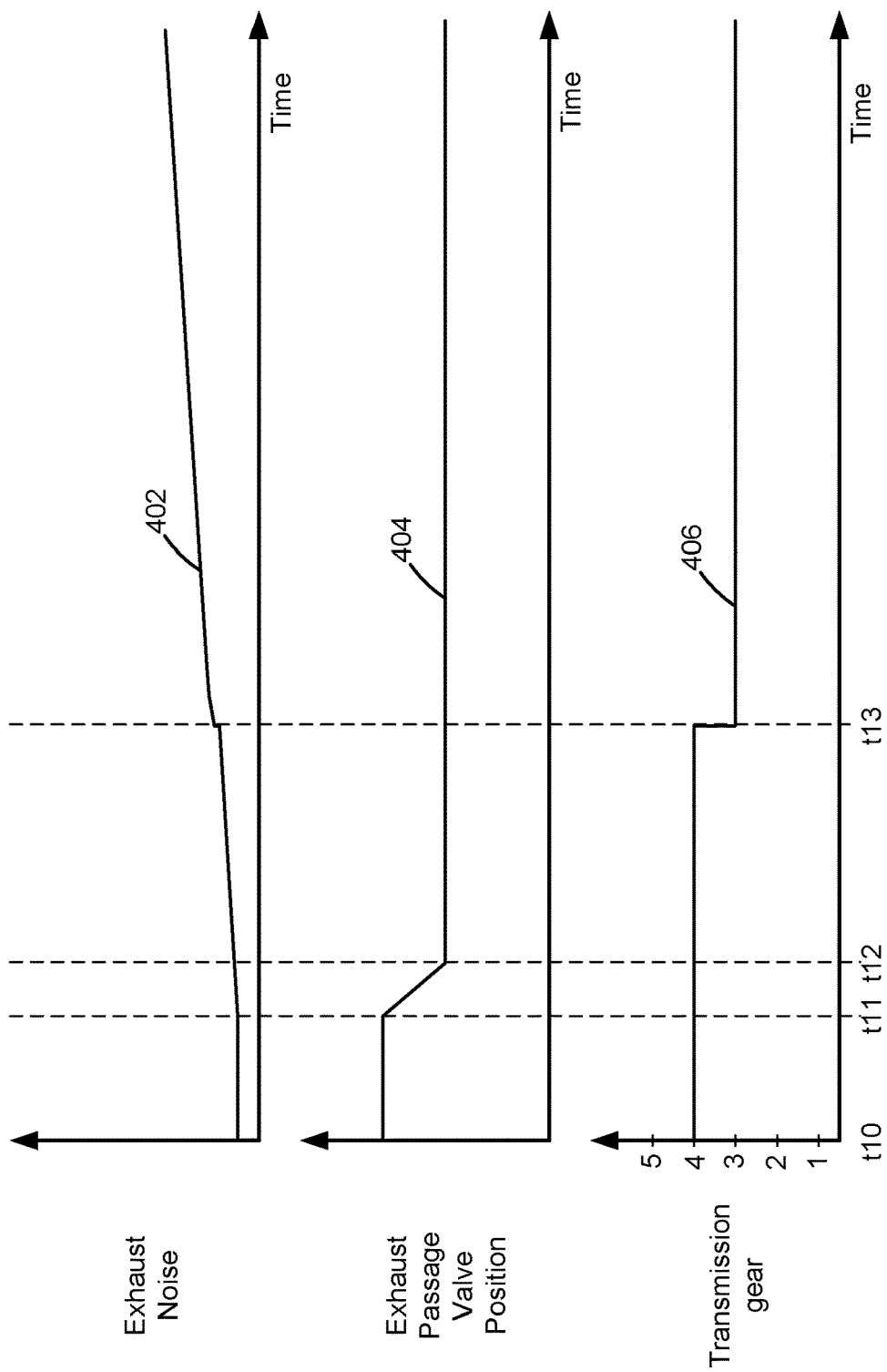
FIG. 4 shows an exhaust valve position changing sequence according to the present method.

Referring now to FIG. 4, a prophetic exhaust valve adjustment procedure according to the present description is shown. The plots occur at the same time and they are aligned in time. The vertical lines at times t10-t14 represents times of interest during the sequence. The sequence of FIG. 4 is identical to the sequence of FIG. 3 except for the exhaust valve shown in FIG. 4 is adjusted according to a grade of a road that is being traveled by the same vehicle.

The first plot from the top of FIG. 4 is a plot of engine exhaust system noise level (e.g., decibels) versus time. The engine exhaust system noise level increases in the direction of the vertical axis arrow. The horizontal axis represents time and time increases from the left side of the plot to the right side of the plot. Trace 402 represents an engine noise level. The exhaust noise magnitude of the vertical axis in the first plot from the top of FIG. 4 is equal to the exhaust noise magnitude of the vertical axis in the first plot from the top of FIG. 3.

The second plot from the top of FIG. 4 is a plot of engine exhaust valve opening amount or position versus time. The engine exhaust valve opening amount or position increases in the direction of the vertical axis arrow. The horizontal axis represents time and time increases from the left side of the plot to the right side of the plot. Trace 404 represents an opening amount of an exhaust valve (e.g., 196a). The exhaust valve position magnitude of the vertical axis in the second plot from the top of FIG. 4 is equal to the exhaust valve position magnitude of the vertical axis in the second plot from the top of FIG. 3.

The third plot from the top of FIG. 4 is a plot of transmission gear versus time. The transmission gear that is engaged is indicated via the numbering along the vertical axis. The horizontal axis represents time and time increases from the left side of the plot to the right side of the plot. Trace 406 indicates which gear of the transmission is presently engaged.

At time t10, the exhaust noise level is low and the exhaust valve position is open a large amount while a vehicle (not shown) transmission is engaged in fourth gear. Such conditions may be present when a vehicle is cruising at highway speed.

At time t11, a grade of a road that the vehicle is traveling on begins to increase (not shown). The exhaust valve position is reduced to partially close the exhaust valve in response to the increase in road grade. By knowing the road grade ahead of a time when driver demand causes a transmission downshift, it may be possible to position the exhaust valve so that a burst of noise does not exit the exhaust system during a transmission downshift. In this example, the exhaust valve is partially closed shortly after time tn. The exhaust noise begins to increase shortly after time t11 as a human driver begins to increase a position of an accelerator pedal (not shown) to maintain vehicle speed, but the exhaust noise is reduced since the exhaust valve has been closed further.

At time t12, the exhaust valve ceases closing and it is less open than it was before time t11 so that there may be less exhaust noise. The transmission remains engaged in fourth gear and the exhaust noise increases gradually as driver demand torque (not shown) increases so that vehicle speed may be maintained while the road grade (not shown) is at a higher level.

At time t13, the transmission is downshifted from fourth gear to third gear based on engine load or driver demand torque and engine speed. The exhaust noise increases a small amount in response to the downshift since downshifting the transmission increases engine speed (not shown). The position of the exhaust valve remains at a reduced opening amount.

In this way, bursts of exhaust noise due to transmission downshifting may be reduced. Thus, the grade of the road may provide an early indication of an expected engine load increase and a transmission gear shift (e.g., upshift or downshift).

Figure 5B:
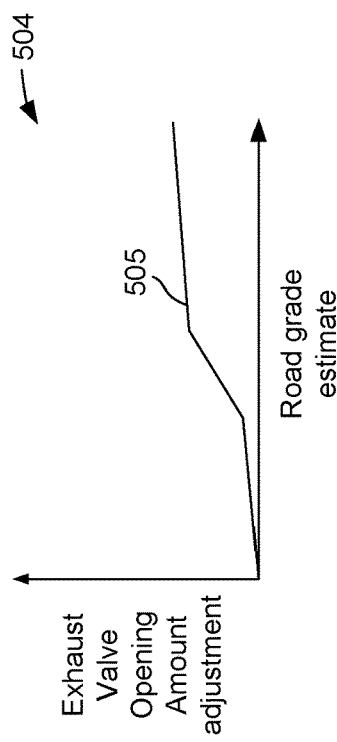
FIGS. 5A-5D show example maps for adjusting exhaust valve position.
Figure 5D:
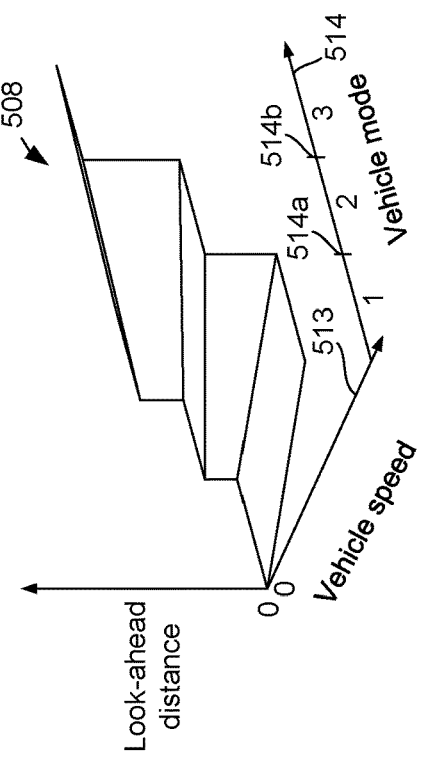
Figure 5A:
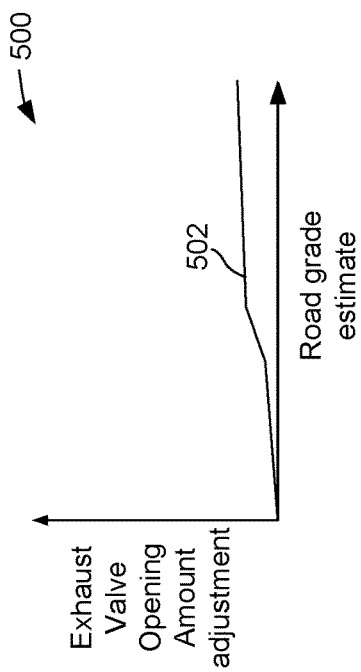

Referring now to FIG. 5A, an example map 500 showing an exhaust valve opening amount adjustment that is based on road grade estimate when a vehicle is operated in a "quiet" mode is shown. In this example, the vertical axis represents an exhaust valve opening amount adjustment and the exhaust valve opening amount adjustment increases in the direction of the vertical axis arrow. The exhaust valve opening amount adjustment is zero at the level of the horizontal axis. The horizontal axis represents a grade value of a road that is being traveled by a vehicle and the grade increases in the direction of the horizontal axis arrow. Line 502 represents the relationship between exhaust valve opening amount adjustment and grade of a road when a vehicle is operating in a "quiet" mode.

Thus, it may be observed that the exhaust valve opening amount adjustment increases as road grade increases; however, the exhaust valve opening amount adjustment is rather small even at higher grades so that engine exhaust noise may be low. In one example, the exhaust valve opening amount adjustment may be added to outputs of other maps or functions that collectively determine the exhaust valve opening amount. For example, the exhaust valve opening amount may be a function of engine speed and engine load for a particulate mode of operation (e.g., quiet, baseline, sport, or track modes) and the exhaust valve opening amount may increase when the exhaust valve opening amount adjustment output from map 500 increases. Thus, the exhaust valve opening amount may be described as a function of several parameters (e.g., exhaust valve position=f(N,L)+f1(vehicle mode, road grade), where f and f1 are functions that return values that generate the exhaust valve position, N is engine speed, and L is engine load).

Referring now to FIG. 5B, an example map 504 showing an exhaust valve opening amount adjustment that is based on road grade estimate when a vehicle is operated in a "base" mode is shown. In this example, the vertical axis represents an exhaust valve opening amount adjustment and the exhaust valve opening amount adjustment increases in the direction of the vertical axis arrow. The exhaust valve opening amount adjustment is zero at the level of the horizontal axis. The horizontal axis represents a grade value of a road that is being traveled by a vehicle and the grade increases in the direction of the horizontal axis arrow. Line 505 represents the relationship between exhaust valve opening amount adjustment and grade of a road when a vehicle is operating in a "base" mode. Thus, it may be observed that the exhaust valve opening amount adjustment increases as road grade increases. In addition, the exhaust valve opening amount adjustment increases at a faster rate as road grade increases as compared to map 500. A vehicle operator may expect engine exhaust noise to increase more substantially in a base mode.

Figure 5C:
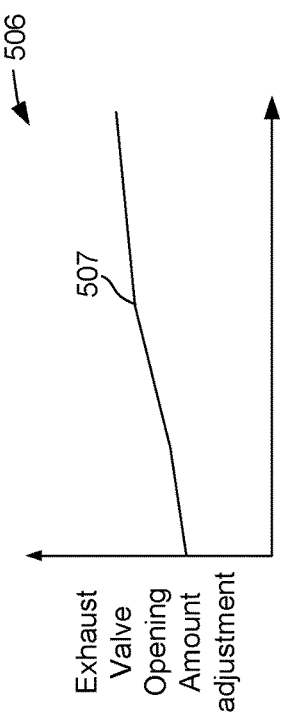

Referring now to FIG. 5C, an example map 506 showing an exhaust valve opening amount adjustment that is based on road grade estimate when a vehicle is operated in a "sport" mode is shown. In this example, the vertical axis represents an exhaust valve opening amount adjustment and the exhaust valve opening amount adjustment increases in the direction of the vertical axis arrow. The exhaust valve opening amount adjustment is zero at the level of the horizontal axis. The horizontal axis represents a grade value of a road that is being traveled by a vehicle and the grade increases in the direction of the horizontal axis arrow. Line 507 represents the relationship between exhaust valve opening amount adjustment and grade of a road when a vehicle is operating in a "sport" mode. Thus, it may be observed that the exhaust valve opening amount is always greater than zero and it increases as road grade increases. In addition, the exhaust valve opening amount adjustment increases for a given road grade is greater in map 506 than in map 504. A similar map may be generated for when the vehicle operates in "track" mode; however, the exhaust valve opening amount adjustment may be a larger constant value for "track" mode.

Values in maps 500, 504, and 506 may be empirically determined via operating a vehicle on a road and adjusting the exhaust valve opening amount adjustment as a function of road grade. In one example, the exhaust valve opening amount is adjusted so that the exhaust valve has time to be repositioned before the vehicle shifts due to a grade of the road. In addition, it should be appreciated that maps 500, 504, and 506 are exemplary in nature and exhaust valve position may be determined as a function of road grade and other control parameters. Further, in other examples, the maps relating road grade to exhaust valve position may also be functions of additional vehicle control parameters. For example, instead of maps that are two dimensional as shown in FIGS. 5A-5C, the maps may be of three or more dimensions. In addition, the exhaust valve may be commanded fully closed independent of vehicle mode when the vehicle's transmission is engaged in reverse so that driver distraction may be reduced.

Turning now to FIG. 5D, a map 508 for determining a look-ahead distance (e.g., a distance from the vehicle in the direction of vehicle travel) for which road grade is determined or estimated. For example, if the vehicle's present location is X, traveling forward, and the look-ahead distance is 100 meters, then road grade may be estimated for a road that the vehicle is traveling at a distance of 100 meters in front of the vehicle's present location.

The vertical axis represents the look-ahead distance for estimating grade of a road. The look-ahead distance increases in the direction of the vertical axis arrow. Axis 513 represents vehicle speed and vehicle speed increases in the direction of the arrow of axis 513. Axis 514 represents vehicle mode and there are three modes in this example. The boundaries of the three modes are indicated at 514a and 514b. The first mode is indicated as "1," the second mode is indicated as "2," and the third mode is indicated as "3."

In this example, the look-ahead distance is zero at zero vehicle speed when the vehicle mode is "1." A vehicle mode of "1" may be a "quiet" mode for example. The look-ahead distance increases as vehicle speed increases for each of the three modes. By increasing the look-ahead distance as a function of vehicle speed, additional time may be allotted to move the exhaust valve so that the exhaust valve is positioned as desired when the vehicle meets the road grade at the look-ahead distance.

The look-ahead distance for mode "2" is positive and non-zero when vehicle speed is zero and the look-ahead distance for a given vehicle speed is greater in mode "2" than in mode "1." A vehicle mode of "2" may be a "base" mode for example. The "base" mode may tolerate higher engine exhaust noise levels as compared to the "quiet" mode and it may be desirable to adjust a position of the exhaust valve sooner in mode "2" so that the possibility of a burst of engine noise from the exhaust system during downshifting may be prevented.

The look-ahead distance for mode "3" is also positive and non-zero when vehicle speed is zero and the look-ahead distance for a given vehicle speed is greater in mode "3" than in mode "2." A vehicle mode of "3" may be a "sport" mode for example. The "sport" mode may tolerate higher engine exhaust noise levels as compared to the "base" mode and it may be desirable to adjust a position of the exhaust valve sooner in mode "3" than in mode "2" so that the possibility of a burst of engine noise from the exhaust system during downshifting may be prevented.

Values in map 508 may be empirically determined via operating a vehicle on a road and adjusting the look-ahead distance in each vehicle mode as a function of vehicle speed. In one example, the look-ahead distance for a vehicle speed is adjusted so that the exhaust valve has time to be repositioned before the vehicle reaches the location on the road that is the look-ahead distance from the vehicle.

Figure 6:
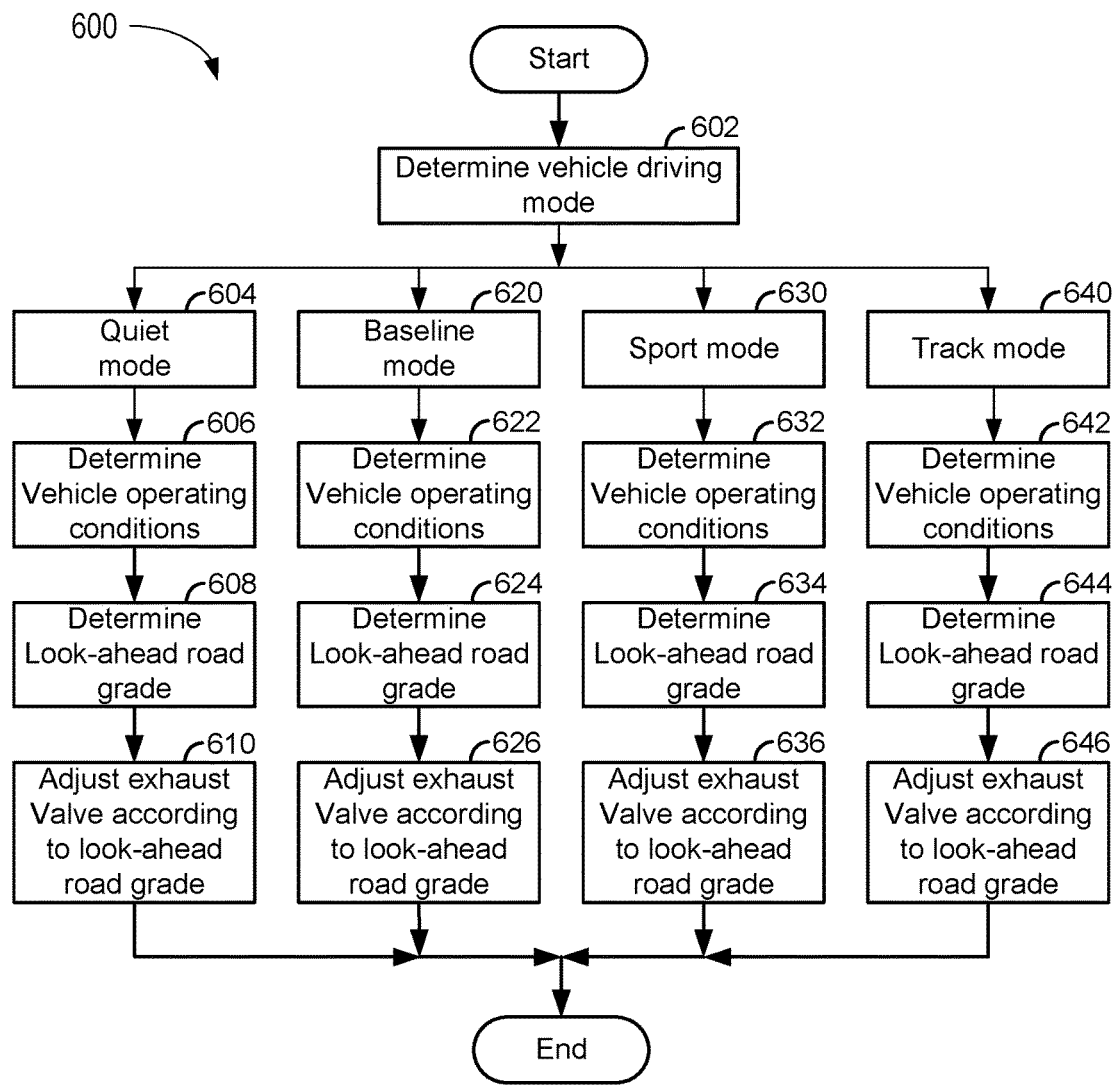
FIG. 6 shows a flowchart representing an exemplary method for adjusting a position of an exhaust valve.

Referring now to FIG. 6, a method for operating an engine and an exhaust system is shown. The method of FIG. 6 may be performed when an engine is combusting fuel and rotating. The engine may be included in a vehicle and the vehicle may be traveling on a road. At least portions of method 600 may be implemented as executable controller instructions stored in non-transitory memory. Method 600 may operate in cooperation with the system of FIGS. 1A-2B. Additionally, portions of method 600 may be actions taken in the physical world to transform an operating state of an actuator or device. The method of FIG. 6 may be incorporated into the system of FIGS. 1A-2B as executable instructions stored in non-transitory memory. The method of FIG. 6 may be applied to one or more exhaust valves.

At 602, method 600 determines the vehicle driving mode. In one example, method 600 may determine the vehicle driving mode from a human/machine interface. The vehicle driving modes may include but are not limited to "quiet," "base," "sport," and "track." In "quiet" mode, the engine exhaust noise may be reduced substantially. In "base" mode, the engine exhaust noise may be greater than in "quiet" mode. In "sport" mode, the engine exhaust noise may be greater than in "base" mode and engine and vehicle suspension settings may be adjusted to improve engine and suspension performance as compared to in "base" mode. In "track" mode, the engine exhaust noise may be greater than in "sport" mode and engine and vehicle suspension settings may be adjusted to improve engine and suspension performance as compared to in "sport" mode. Method 600 proceeds to 604 if method 600 judges that the vehicle mode is "quiet." Method 600 proceeds to 620 if method 600 judges that the vehicle mode is "base." Method 600 proceeds to 630 if method 600 judges that the vehicle mode is "sport." Method 600 proceeds to 640 if method 600 judges that the vehicle mode is "track."

At 604, method 600 enters "quiet" mode and the position of the exhaust valve is adjusted based on being in "quiet" mode. Method 600 may also adjust engine control parameters and suspension control parameters for operating in "quiet" mode. For example, method 600 may retard spark timing to smooth engine torque and reduce engine noise as compared to when the vehicle is operated in "base" mode. Method 600 proceeds to 606.

At 606, method 600 determines vehicle operating conditions. Vehicle operating conditions may include but are not limited to engine speed, engine load, vehicle speed, vehicle geographical position, presently engaged transmission gear, and ambient temperature. Method 600 proceeds to 608 after determining vehicle operating conditions.

At 608, method 600 determines a look-ahead distance and road grade at the look-ahead distance. In one example, method 600 determines the look-ahead distance based on vehicle speed and the vehicle's present operating mode. In particular, the look-ahead distance may be stored in a map or table (e.g., as shown in FIG. 5D) and the map may be referenced or indexed via vehicle speed and the present vehicle operating mode. The map may contain empirically determined values that may be determined via operating the vehicle on a variety of roads while adjusting the look-ahead distance and monitoring vehicle operation. The map or table outputs the look-ahead distance. The look-ahead distance may range from 0 (e.g., the vehicle's present location) to a predetermined distance (e.g., 2000 meters).

Method 600 determines grade of the road that the vehicle is presently traveling upon at the look-ahead distance in the direction of vehicle travel. In one example, method 600 determines the vehicle's present location via a global positioning system. The vehicle's present location is used to reference geographical maps that may be stored in controller memory. The look-ahead distance is added to the vehicle's present location on a road and the map outputs grade of the road that the vehicle is traveling on the look-ahead distance ahead of the vehicle's present location. The maps may include road locations, road grade data, and road speed limits.

In examples where the look-ahead road grade is not available, method 600 may determine the present road grade via an inclinometer, or from yaw, pitch, and roll accelerometers. Method 600 proceeds to 610.

At 610, method 600 adjusts a position of an exhaust valve (e.g., 196a and/or 196b) according to the grade of the road at the look-ahead distance from the vehicle. In one example, the position of the exhaust valve is adjusted according to an exhaust valve opening amount adjustment value. The exhaust valve opening amount adjustment value may be combined with other exhaust valve opening amount adjustment values that are based on engine speed, engine load, and other control parameters.

The exhaust valve opening amount adjustment values may be stored in maps or tables as shown in FIGS. 5A-5C. The maps include a map for "quiet" mode and the "quiet" mode map may be referenced via road grade. The map for "quiet" mode is referenced according to the road grade at the look-ahead vehicle position and the "quiet" mode map outputs an exhaust valve opening amount adjustment value. Method 600 adjusts the position of the exhaust valve in response to exhaust valve opening amount adjustment value that is based on road grade and "quiet" mode. In addition, method 600 adjusts the position of the exhaust valve according to other control parameters (e.g., engine speed and engine load). Method 600 proceeds to exit.

At 620, method 600 enters "base" mode and the position of the exhaust valve is adjusted based on being in "base" mode. Method 600 may also adjust engine control parameters and suspension control parameters for operating in "base" mode. For example, method 600 may operate at a nominal spark timing to improve engine fuel economy as compared to when the vehicle is operated in "quiet" mode. Method 600 proceeds to 622.

At 622, method 600 determines vehicle operating conditions. Vehicle operating conditions may include but are not limited to engine speed, engine load, vehicle speed, vehicle geographical position, presently engaged transmission gear, and ambient temperature. Method 600 proceeds to 624 after determining vehicle operating conditions.

At 624, method 600 determines a look-ahead distance and road grade at the look-ahead distance. In one example, method 600 determines the look-ahead distance based on vehicle speed and the vehicle's present operating mode. In particular, the look-ahead distance may be stored in a map or table and the map may be referenced or indexed via vehicle speed and the present vehicle operating mode. The map may contain empirically determined values that may be determined via operating the vehicle on a variety of roads while adjusting the look-ahead distance and monitoring vehicle operation. The map or table outputs the look-ahead distance. The look-ahead distance may range from 0 (e.g., the vehicle's present location) to a predetermined distance (e.g., 2000 meters).

Method 600 determines grade of the road that the vehicle is presently traveling upon at the look-ahead distance in the direction of vehicle travel. In one example, method 600 determines the vehicle's present location via a global positioning system. The vehicle's present location is used to reference geographical maps that may be stored in controller memory. The look-ahead distance is added to the vehicle's present location on a road and the map outputs grade of the road that the vehicle is traveling on the look-ahead distance ahead of the vehicle's present location.

In examples where the look-ahead road grade is not available, method 600 may determine the present road grade via an inclinometer, or from yaw, pitch, and roll accelerometers. Method 600 proceeds to 626.

At 626, method 600 adjusts a position of an exhaust valve (e.g., 196*a* and/or 196*b*) according to the grade of the road at the look-ahead distance from the vehicle. In one example, the position of the exhaust valve is adjusted according to an exhaust valve opening amount adjustment value. The exhaust valve opening amount adjustment value may be combined with other exhaust valve opening amount adjustment values that are based on engine speed, engine load, and other control parameters.

The exhaust valve opening amount adjustment values may be stored in maps or tables as shown in FIGS. 5A-5C. The maps include a map for "base" mode and the "base" mode map may be referenced via road grade. The map for "base" mode is referenced according to the road grade at the look-ahead vehicle position and the "base" mode map outputs an exhaust valve opening amount adjustment value. Method 600 adjusts the position of the exhaust valve in response to exhaust valve opening amount adjustment value that is based on road grade and "base" mode. In addition, method 600 adjusts the position of the exhaust valve according to other control parameters (e.g., engine speed and engine load). Method 600 proceeds to exit.

At 630, method 600 enters "sport" mode and the position of the exhaust valve is adjusted based on being in "sport" mode. Method 600 may also adjust engine control parameters and suspension control parameters for operating in "sport" mode. For example, method 600 may operate at an advanced spark timing to improve engine fuel economy as compared to when the vehicle is operated in "base" mode. Method 600 proceeds to 632.

At 632, method 600 determines vehicle operating conditions. Vehicle operating conditions may include but are not limited to engine speed, engine load, vehicle speed, vehicle geographical position, presently engaged transmission gear, and ambient temperature. Method 600 proceeds to 634 after determining vehicle operating conditions.

At 634, method 600 determines a look-ahead distance and road grade at the look-ahead distance. In one example, method 600 determines the look-ahead distance based on vehicle speed and the vehicle's present operating mode. In particular, the look-ahead distance may be stored in a map or table and the map may be referenced or indexed via vehicle speed and the present vehicle operating mode. The map may contain empirically determined values that may be determined via operating the vehicle on a variety of roads while adjusting the look-ahead distance and monitoring vehicle operation. The map or table outputs the look-ahead distance. The look-ahead distance may range from 0 (e.g., the vehicle's present location) to a predetermined distance (e.g., 2000 meters).

Method 600 determines grade of the road that the vehicle is presently traveling upon at the look-ahead distance in the direction of vehicle travel. In one example, method 600 determines the vehicle's present location via a global positioning system. The vehicle's present location is used to reference geographical maps that may be stored in controller memory. The look-ahead distance is added to the vehicle's present location on a road and the map outputs grade of the road that the vehicle is traveling on the look-ahead distance ahead of the vehicle's present location.

In examples where the look-ahead road grade is not available, method 600 may determine the present road grade via an inclinometer, or from yaw, pitch, and roll accelerometers. Method 600 proceeds to 636.

At 636, method 600 adjusts a position of an exhaust valve (e.g., 196*a* and/or 196*b*) according to the grade of the road at the look-ahead distance from the vehicle. In one example, the position of the exhaust valve is adjusted according to an exhaust valve opening amount adjustment value. The exhaust valve opening amount adjustment value may be combined with other exhaust valve opening amount adjustment values that are based on engine speed, engine load, and other control parameters.

The exhaust valve opening amount adjustment values may be stored in maps or tables as shown in FIGS. 5A-5C. The maps include a map for "sport" mode and the "sport" mode map may be referenced via road grade. The map for "sport" mode is referenced according to the road grade at the look-ahead vehicle position and the "sport" mode map outputs an exhaust valve opening amount adjustment value. Method 600 adjusts the position of the exhaust valve in response to exhaust valve opening amount adjustment value that is based on road grade and "sport" mode. In addition, method 600 adjusts the position of the exhaust valve according to other control parameters (e.g., engine speed and engine load). Method 600 proceeds to exit.

At 640, method 600 enters "track" mode and the position of the exhaust valve is adjusted based on being in "track" mode. Method 600 may also adjust engine control parameters and suspension control parameters for operating in "track" mode. For example, method 600 may operate at an advanced spark timing to improve engine fuel economy as compared to when the vehicle is operated in "sport" mode. Method 600 proceeds to 642.

At 642, method 600 determines vehicle operating conditions. Vehicle operating conditions may include but are not limited to engine speed, engine load, vehicle speed, vehicle geographical position, presently engaged transmission gear, and ambient temperature. Method 600 proceeds to 644 after determining vehicle operating conditions.

At 644, method 600 determines a look-ahead distance and road grade at the look-ahead distance. In one example, method 600 determines the look-ahead distance based on vehicle speed and the vehicle's present operating mode. In particular, the look-ahead distance may be stored in a map or table and the map may be referenced or indexed via vehicle speed and the present vehicle operating mode. The map may contain empirically determined values that may be determined via operating the vehicle on a variety of roads while adjusting the look-ahead distance and monitoring vehicle operation. The map or table outputs the look-ahead distance. The look-ahead distance may range from 0 (e.g., the vehicle's present location) to a predetermined distance (e.g., 2000 meters).

Method 600 determines grade of the road that the vehicle is presently traveling upon at the look-ahead distance in the direction of vehicle travel. In one example, method 600 determines the vehicle's present location via a global positioning system. The vehicle's present location is used to reference geographical maps that may be stored in controller memory. The look-ahead distance is added to the vehicle's present location on a road and the map outputs grade of the road that the vehicle is traveling on the look-ahead distance ahead of the vehicle's present location.

In examples where the look-ahead road grade is not available, method 600 may determine the present road grade via an inclinometer, or from yaw, pitch, and roll accelerometers. Method 600 proceeds to 646.

At 646, method 600 adjusts a position of an exhaust valve (e.g., 196a and/or 196b) according to the grade of the road at the look-ahead distance from the vehicle. In one example, the position of the exhaust valve is adjusted according to an exhaust valve opening amount adjustment value. The exhaust valve opening amount adjustment value may be combined with other exhaust valve opening amount adjustment values that are based on engine speed, engine load, and other control parameters.

The exhaust valve opening amount adjustment values may be stored in maps or tables as shown in FIGS. 5A-5C. The maps include a map for "track" mode and the "track" mode map may be referenced via road grade. The map for "track" mode is referenced according to the road grade at the look-ahead vehicle position and the "track" mode map outputs an exhaust valve opening amount adjustment value. Method 600 adjusts the position of the exhaust valve in response to exhaust valve opening amount adjustment value that is based on road grade and "track" mode. In addition, method 600 adjusts the position of the exhaust valve according to other control parameters (e.g., engine speed and engine load). Method 600 proceeds to exit.

In this way, a position of an exhaust valve may be adjusted according to a grade of a road. By adjusting the position of the exhaust valve based on grade of a road, it may be possible to anticipate gear shifting of a transmission so that the exhaust valve may be at least partially closed to reduce engine noise to an expected or preferred level.

Thus, the method of FIG. 6 provides for a method for operating an exhaust system of an engine, comprising: adjusting a position of valve in an exhaust system in response to a grade of a road, the valve positioned downstream of an exhaust gas after treatment device. The method includes where the grade of the road is a numeric value. The method further comprises adjusting the position of the valve in further response to a transmission of a vehicle being engaged in a forward gear. The method further comprises adjusting the position of the valve in further response to the transmission of the vehicle being engaged in a reverse gear. The method includes where the valve is adjusted to a first position when the transmission of the vehicle is engaged in the forward gear, where the valve is adjusted to a second position when the transmission of the vehicle is engaged in a reverse gear, and where the first position is different than the second position. The method includes where the grade is determined via an inclinometer. The method includes where the grade is determined via a global positioning system.

The method of FIG. 6 also provides for a method for operating an exhaust system of an engine, comprising: adjusting a look-ahead distance from a vehicle for which a grade of a road is estimated; and adjusting a position of valve in an exhaust system in response to the grade of the road, the valve positioned downstream of an exhaust gas after treatment device. The method includes where adjusting the look-ahead distance includes adjusting the look-ahead distance based on a speed of the vehicle. The method includes where adjusting the look-ahead distance includes adjusting the look-ahead distance based on vehicle operating mode. The method includes where the position of the valve is further closed in response to an increase in the grade of the road. The method includes where the position of the valve is further opened in response to a decrease in the grade of the road. The method further comprises estimating the grade of the road according to vehicle position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an exhaust system of an engine, comprising:
    adjusting a position of valve in an exhaust system in response to a grade of a road, the valve positioned downstream of an exhaust gas after treatment device, where the grade of the road is a numeric value, and where the position of the valve is a function of the grade of the road.

2. The method of claim 1, further comprising adjusting the position of the valve in further response to a transmission of a vehicle being engaged in a forward gear.

3. The method of claim 2, further comprising adjusting the position of the valve in further response to the transmission of the vehicle being engaged in a reverse gear.

4. The method of claim 3, where the valve is adjusted to a first position when the transmission of the vehicle is engaged in the forward gear, where the valve is adjusted to a second position when the transmission of the vehicle is engaged in a reverse gear, and where the first position is different than the second position.

5. The method of claim 1, where the grade is determined via an inclinometer.

6. The method of claim 1, where the grade is determined via a global positioning system.

7. A vehicle system, comprising:
an engine;
an exhaust system coupled to the engine, the exhaust system including a valve positioned downstream of an emissions control device;
a global position receiver; and
a controller including executable instructions stored in non-transitory memory that cause the controller to adjust a position of the valve in response to a grade of a road, the grade of the road based on a position of a vehicle, the position of the vehicle determined via the global position receiver, where the position of the valve is adjusted according to a plurality of valve position maps, and where the position of the valve is a function of the grade of the road.

8. The vehicle system of claim 7, further comprising additional instructions to adjust the position of the valve in response to a vehicle operating mode.

9. The vehicle system of claim 8, where the vehicle operating mode is a quiet mode and where the valve is fully closed.

10. The vehicle system of claim 8, where the vehicle operating mode is a track mode and where the valve is fully opened.

11. The vehicle system of claim 7, where the plurality of valve position maps include a baseline valve map, a sport mode valve map, a track mode valve map, and a quiet mode valve map.

12. The vehicle system of claim 7, further comprising additional instructions to adjust a look-ahead distance from a vehicle for which the grade of the road is estimated.

13. A method for operating an exhaust system of an engine, comprising:
adjusting a look-ahead distance from a vehicle for which a grade of a road is estimated; and
adjusting a position of valve in an exhaust system in response to the grade of the road, the valve positioned downstream of an exhaust gas after treatment device.

14. The method of claim 13, where adjusting the look-ahead distance includes adjusting the look-ahead distance based on a speed of the vehicle.

15. The method of claim 13, where adjusting the look-ahead distance includes adjusting the look-ahead distance based on vehicle operating mode.

16. The method of claim 13, where the position of the valve is further closed in response to an increase in the grade of the road.

17. The method of claim 13, where the position of the valve is further opened in response to a decrease in the grade of the road.

18. The method of claim 13, further comprising estimating the grade of the road according to vehicle position.

* * * * *